Oct. 22, 1929.   B. DARROW   1,732,793
METHOD OF MAKING PNEUMATIC TIRE CASINGS
Filed July 11, 1927   2 Sheets-Sheet 2
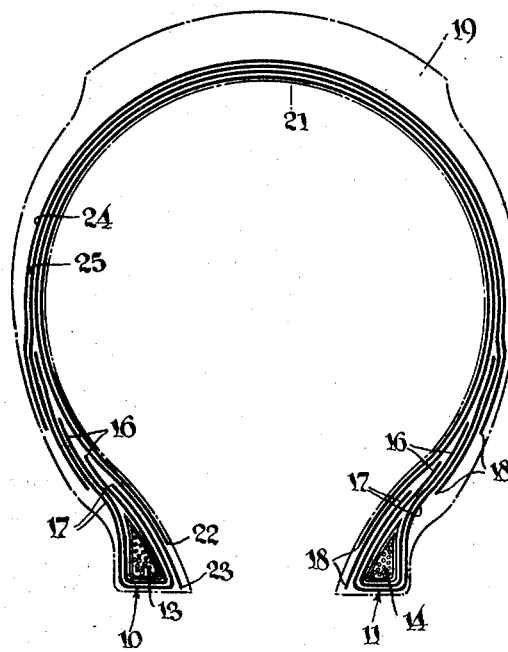
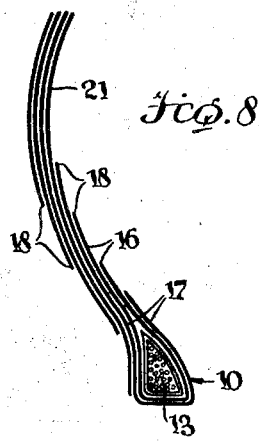
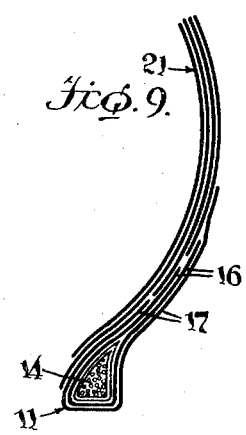
Inventor
Burgess Darrow,
By
Attorney Patented Oct. 22, 1929

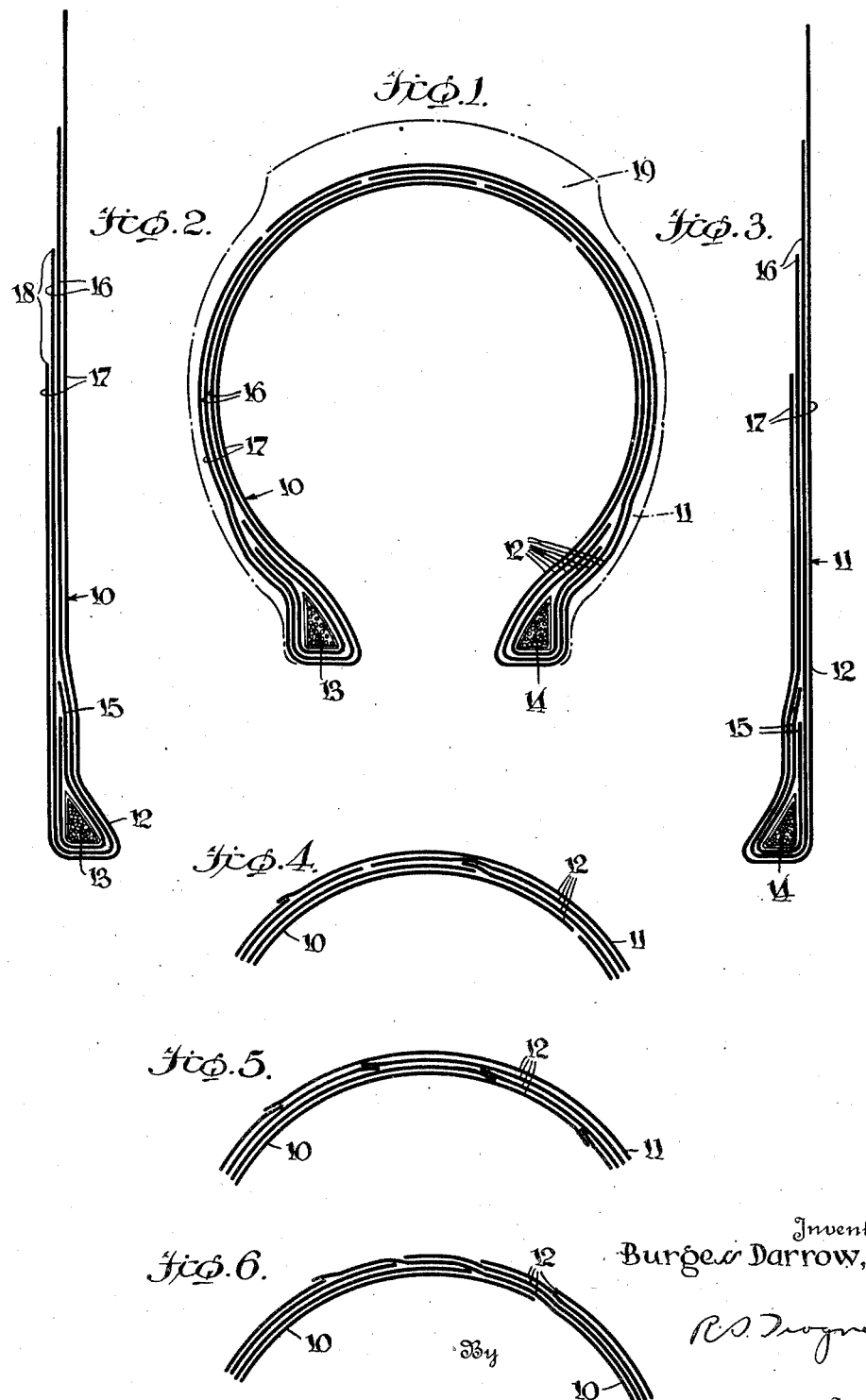

1,732,793

UNITED STATES PATENT OFFICE

BURGESS DARROW, OF AKRON, OHIO, ASSIGNOR TO THE GOODYEAR TIRE & RUBBER COMPANY, OF AKRON, OHIO, A CORPORATION OF OHIO

METHOD OF MAKING PNEUMATIC-TIRE CASINGS

Application filed July 11, 1927. Serial No. 204,842.

My invention relates to pneumatic tire casings and it has particular relation to a method which shall be especially applicable in assembling the component parts of such casings.

One object of my invention is to provide a relatively inexpensively constructed pneumatic tire casing.

Another object of my invention is to provide a pneumatic tire casing which may be constructed by a simplified method that permits the more extensive employment of well known machines.

Prior to my invention, pneumatic tire casings have been constructed by a method which involved principally, a progressive series of manual operations. In practicing the method, a toroidal core or cylindrical drum has been employed upon which the casing was assembled by manually superimposing the several elements of the casing. Each of the plies of rubberized fabric material, of which the carcass was constructed, extended continuously between the tire beads and each required a separate trimming operation. It is well known that this method of constructing tire casings is relatively expensive, it being necessary to employ highly skilled workmen whose time is consumed in painstakingly performing a multiplicity of tedious operations.

According to the principles of my invention, a tire casing is constructed in a plurality of circumferential sections which may be quickly and easily assembled. The sections of the casing may be constructed, if desired, by machines which are at present being employed in a more limited capacity.

For a better understanding of my invention, reference may now be had to the accompanying drawings, forming a part of this specification, in which:

Fig. 1 illustrates diagrammatically a cross-sectional view of a pneumatic tire casing constructed according to the principles of my invention;

Fig. 2 is a cross-sectional view illustrating one of the sections employed in the construction of the pneumatic tire casing illustrated by Fig. 1;

Fig. 3 is a cross-sectional view illustrating the remaining section employed in the construction of the pneumatic tire casing illustrated by Fig. 1;

Fig. 4 is a cross-sectional view of a portion of a carcass of a pneumatic tire casing illustrating another method of uniting the sections of the carcass in which the adjacent edges of the fabric strips are alternately lapped and spaced;

Fig. 5 is a cross-sectional view of a portion of a carcass of a pneumatic tire casing illustrating another method of uniting the sections of the carcass in which the adjacent edges of the fabric strips are substantially overlapped;

Fig. 6 is a cross-sectional view of a portion of a carcass of a pneumatic tire casing illustrating another method of uniting the sections of the carcass which method is especially applicable when the sections employed in the construction of the carcass are identical;

Fig. 7 is a cross-sectional view of a pneumatic tire casing illustrating diagrammatically another form which my invention may assume; and Figs. 8 and 9 are cross-sectional views illustrating other methods of uniting the sections of the carcass as illustrated by Fig. 7.

In practicing my invention I employ a pair of sections 10 and 11 composed of strips of rubberized fabric tire building material 12 supported by a pair of tire beads 13 and 14. The sections 10 and 11 may be constructed in any suitable manner, as for example, on a machine commonly known as a "bead flipping machine." This machine heretofore has been employed only for the purpose of applying a "flipper strip" indicated at 15. However, by properly adjusting the mechanism of the machine employed in contracting the material engaging the inner periphery of the beads, strips of relatively greater width may be similarly applied by the machine. Strips 16 and 17 that are superimposed upon the bead accordingly may be so applied. The margins 18 between the edges of strips of material may be equal or unequal, as desired. On the "bead flipping machine" the desired margins may be obtained by proper manipulation of the marginal adjustment.

The sections 10 and 11 are assembled by uniting the oppositely disposed marginal portions thereof and applying pressure in any suitable manner thereto. To accomplish this result I suggest the employment of any well known tire machine having a core or drum and a bead setter. The sections 10 and 11 are properly positioned in the bead setter of the machine and the mechanism operated in the usual manner to cause the sections to engage the drum or core. The stitcher of the tire machine is then operated to engage first one of the sections and then the other, thus assembling the carcass in one operation. The tread portion 19 of the tire thereafter is applied, the casing being subsequently removed from the machine and vulcanized in the usual manner.

In the carcass illustrated by Fig. 1, the edges of the strips of material in each ply of the carcass are spaced in stepped relation. As illustrated by Fig. 3, the edges are alternately lapped and spaced. In Fig. 5 all of the edges are lapped. These variations may be obtained on the "bead flipping machine" by properly manipulating the marginal adjustment and by changing the width of the strips of material.

If desired, a tire carcass may be constructed according to my method by employing two sections that are identical rather than complementary as by employing two sections similar to section 10. One of the sections is reversed relative to the other and the tapered portions united as indicated by Fig. 6.

In the embodiment of my invention illustrated by Fig. 7, the sections 10 and 11 are constructed of relatively narrow strips of material and a section 21, composed of strips of material of unequal width 22, 23, 24 and 25, is adapted to be united with the sections 10 and 11. If it is desirable to assemble the sections 10, 11 and 21 on a tire machine, the plies 22 and 23 may be stitched to the core or drum of the tire machine, either separately or as a previously assembled unit. Thereafter, the sections at 10 and 11 are positioned by a bead setter on the margins between the edges of the strips. Plies 24 and 25 then are superimposed either separately or as a unit upon the portion of the carcass previously assembled. The plies 22, 23, 24 and 25 may, if desired, be assembled as a unit prior to their application to the core and the plies 23 and 24 separated to receive the sections 10 and 11.

In the embodiment of the invention illustrated by Fig. 8, the sections 10 and 11 are adapted to be positioned immediately adjacent the core or drum of the tire machine and the section 21 superimposed thereon.

The embodiment of the invention illustrated by Fig. 9 is constructed similarly to that illustrated by Fig. 8, except that the section 21 is positioned on the core or drum prior to the sections 10 and 11.

It is apparent that by the employment of my invention, a pneumatic tire casing may be constructed largely by machines. Also a substantial saving of material is realized by the elimination of waste incidental to the trimming operations heretofore necessary in constructing a pneumatic tire casing.

Although I have illustrated but the preferred forms which my invention may assume and have described those forms in detail, it will be apparent to those skilled in the art that it is not so limited but that various minor modifications and changes may be made therein without departing from the spirit of my invention or from the scope of the appended claims.

What I claim is:

1. A method of constructing a pneumatic tire casing which comprises building circumferential sections of the carcass of the casing with complementary mating edges of diminishing thickness and assembling the sections by joining the complementary mating edges thereof.

2. A method of constructing a pneumatic tire casing which comprises folding a strip of tire building material about a tire bead, the edges of the strip extending unequally from a peripheral portion of the bead, and joining to the strips other strips of material with the edges thereof disposed adjacent the first mentioned edges, and with the main portion of the second mentioned strips extending away from the bead.

3. The method of constructing a pneumatic tire casing which comprises building a pair of bead supporting skirts tapered at the extremities thereof and assembling the carcass of the casing by uniting the tapered portions of the bead skirts.

In witness whereof, I have hereunto signed my name.

Signed at Akron, in the county of Summit, and State of Ohio, this 8th day of July, 1927.

BURGESS DARROW.